US005545116A

United States Patent [19]

Seto

[11] Patent Number: 5,545,116

[45] Date of Patent: Aug. 13, 1996

[54] TURRET PUNCH PRESS

[75] Inventor: Yoshiharu Seto, La Mirada, Calif.

[73] Assignee: Amada MFG America Inc., La Mirada, Calif.

[21] Appl. No.: 181,256

[22] Filed: Jan. 13, 1994

[51] Int. Cl.[6] .................................................. B23Q 3/155

[52] U.S. Cl. ................................ 483/29; 72/446; 83/552; 83/559; 83/564

[58] Field of Search ............................ 83/552, 559, 564; 483/28, 29; 72/446

[56] References Cited

U.S. PATENT DOCUMENTS

| | | | |
|---|---|---|---|
| 3,745,646 | 7/1973 | Kristiansson . | |
| 4,485,549 | 12/1984 | Brolund | 483/28 |
| 5,215,513 | 6/1993 | Maynard et al. . | |
| 5,346,454 | 9/1994 | Hayashi | 83/552 |
| 5,350,347 | 9/1994 | Fujiwara et al. | 483/28 X |

*Primary Examiner*—Rinaldi I. Rada

*Attorney, Agent, or Firm*—Wigman, Cohen, Leitner & Myers, P.C.

[57] ABSTRACT

In a turret punch press 1 provided with an upper rotatable turret 5 having a plurality of punches P and a lower rotatable turret 7 having a plurality of dies D, a diameter of the lower turret 7 is determined to be larger than that of the upper turret 5; rotational centers of the upper and lower turrets 5 and 7 are determined to be eccentric from each other; and on a line obtained by connecting the two rotational centers of both the upper and lower turrets when seen on a plane, a position at which the upper and lower turrets 5 and 7 are overlapped upon each other is determined to be a punching position 21 and positions remotely opposite to the punching position 21 and at which the upper and lower turrets 5 and 7 are separated from each other are determined to be indexing positions 61 at which the angular positions of the punch P and the die D can be both indexed. In the turret punch press, it is possible to easily index the angular positions of a plurality of the punches and the dies at need, and further to facilitate the automatization of the turret punch press.

3 Claims, 8 Drawing Sheets

TURRET PUNCH PRESS

BACKGROUND OF THE INVENTION

1. Field of the Invention

The present invention relates to a turret punch press, and more specifically to a turret punch press, by which angular positions of a plurality of punches and dies arranged on upper and lower turrets can be indexed, respectively.

2. Description of the Background Art

In the conventional turret punch press, a plurality of punches and dies are arranged on an upper and lower turrets of the same diameter, respectively, and further only a pair of punch and die arranged so as to be opposed to each other among the other pairs are indexed, as an indexed die, with a well-known indexing mechanism. Therefore, the punches and the dies other than the indexed die are usually indexed manually by the worker, without being automatized.

In more detail, since the diameters of the upper and lower turrets are the same in both, although it may be possible to raise the upper turret upward in order to index the punches, it is impossible to raise the lower turrets upward in order to index the dies because the upper turret is positioned over the lower turret. Accordingly, it has been necessary to index the die from the circumferential side of the lower turret, with the result that the automatic mechanism for indexing the dies is strictly restricted in space and therefore is complicated in construction when automatized. In other words, it has been so far difficult to automatize the indexing work of the dies in practice.

SUMMARY OF THE INVENTION

With these problems in mind, therefore, it is the object of the present invention to provide a turret punch press by which a plurality of punches and dies arranged on both the upper and lower turrets can be indexed easily at need, and in particular which enables the automatization of indexing both the punches and dies, simultaneously.

To achieve the above-mentioned object, the present invention provides a turret punch press provided with an upper rotatable turret having a plurality of punches and a lower rotatable turret having a plurality of dies, wherein a diameter of the lower turret is determined to be larger than that of the upper turret; rotational centers of the upper and lower turrets are determined to be eccentric from each other; and on a line obtained by connecting the two rotational centers of both the upper and lower turrets when seen on a plane, a position at which the upper and lower turrets are overlapped upon each other is determined to be a punching position and positions remotely opposite to the punching position and at which the upper and lower turrets are separated from each other are determined to be indexing positions at which the angular positions of the punch and the die can be both indexed.

Further, in the turret punch press according to the present invention, a plurality of key grooves are formed at regular angular intervals on an outer circumference of the punch and the die, respectively; and a key engageable with one of the key grooves is projectingly disposed in an inner circumference of a punch set hole and a die set hole formed in the upper and lower turrets, respectively. Or else, a key is projectingly disposed on an outer circumference of the punch and the die, respectively; and a plurality of key grooves engageable with the key are formed at regular angular intervals on an inner circumference of a punch set hole and a die set hole formed in the upper and lower turrets, respectively.

Further, it is preferable to dispose support devices for gripping the punch and the die, moving the gripped punch and the dies up and down, and further rotating the gripped and raised punch and die, over the rotation indexing position of the punch and over or under the rotation indexing position of the die, respectively.

In the turret punch press according to the present invention, the diameter of the lower turret is determined to be larger that of the upper turret; the rotational centers of both the upper and lower turrets are determined to be eccentric from each other; and further on a line obtained by connecting the two rotational centers of both the upper and lower turrets when seen on a plane, a position at which the upper and lower turrets are overlapped upon each other is determined to be a punching position at which work is punched, and positions remotely opposite to the punching position and at which the upper and lower turrets are separated from each other are determined to be indexing positions at which the angular positions of the punch and the die can be both indexed.

In the above-mentioned construction, since the punch and the die are both opened upward at the rotation indexing positions respectively, it is possible to index both the punch and the die easily in the indexing position.

For instance, when the punch and the die are gripped and further raised by the support devices disposed over the punch and the die, a plurality of the key grooves formed on the outer circumference of the punch and the die are removed from the keys provided on the inner circumference of the punch and die set holes formed in the upper and lower turrets, respectively. Under these conditions, when the punch and the die are both rotated by any desired angle and then the keys are engaged with other key grooves, the rotation indexing of the punch and the die can be completed.

DETAILED DESCRIPTION OF THE PREFERRED EMBODIMENTS

The embodiments of the present invention will be described hereinbelow with reference to the attached drawings. Here, however, since the turret punch press itself is well known in function and in construction, the detailed description thereof is omitted herein.

Figure 5:
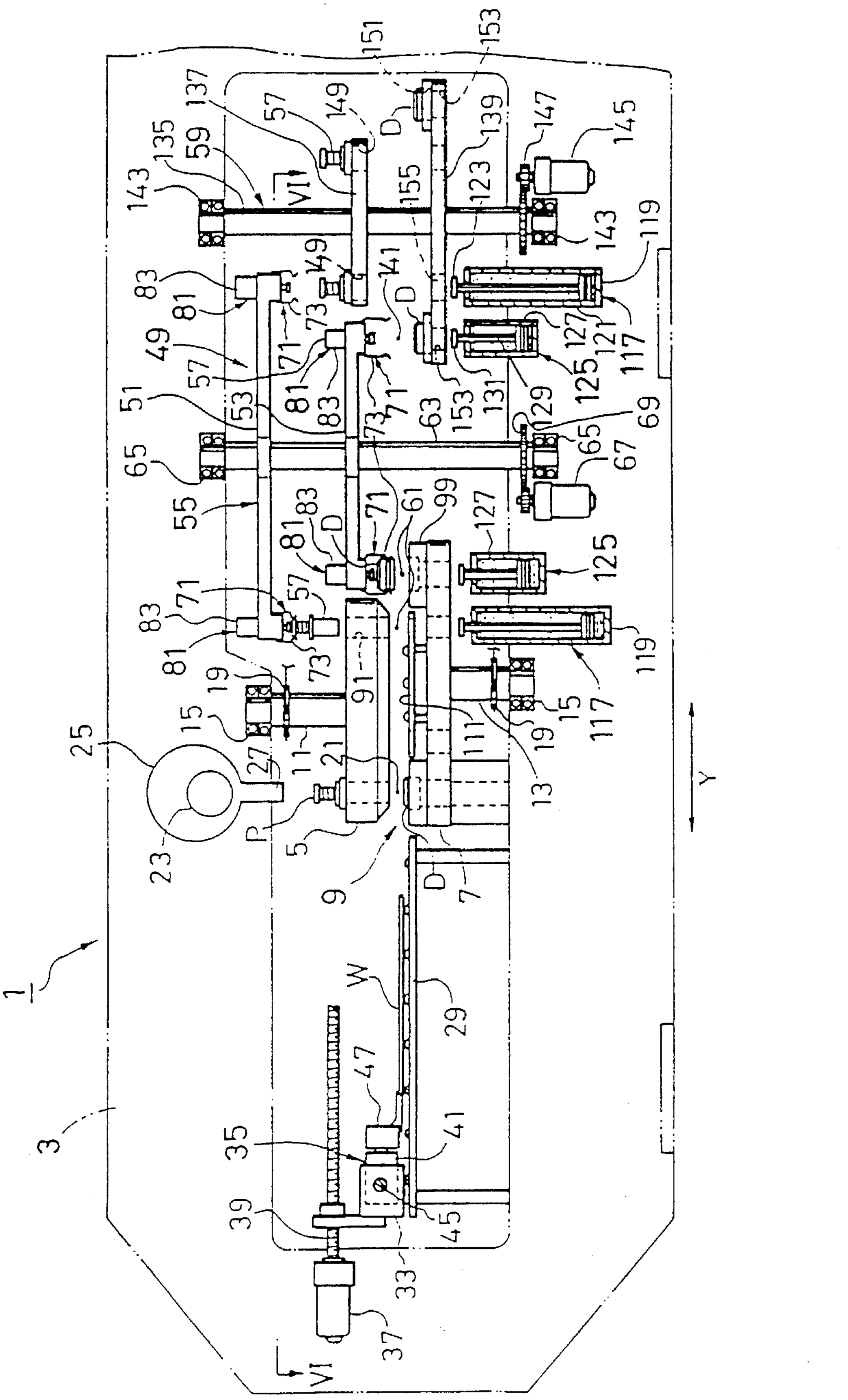
FIG. 5 is a front view showing a turret punch press provided with an automatic die exchanging apparatus, to which the mechanism for indexing the punch and die according to the present invention can be applied.
Figure 6:
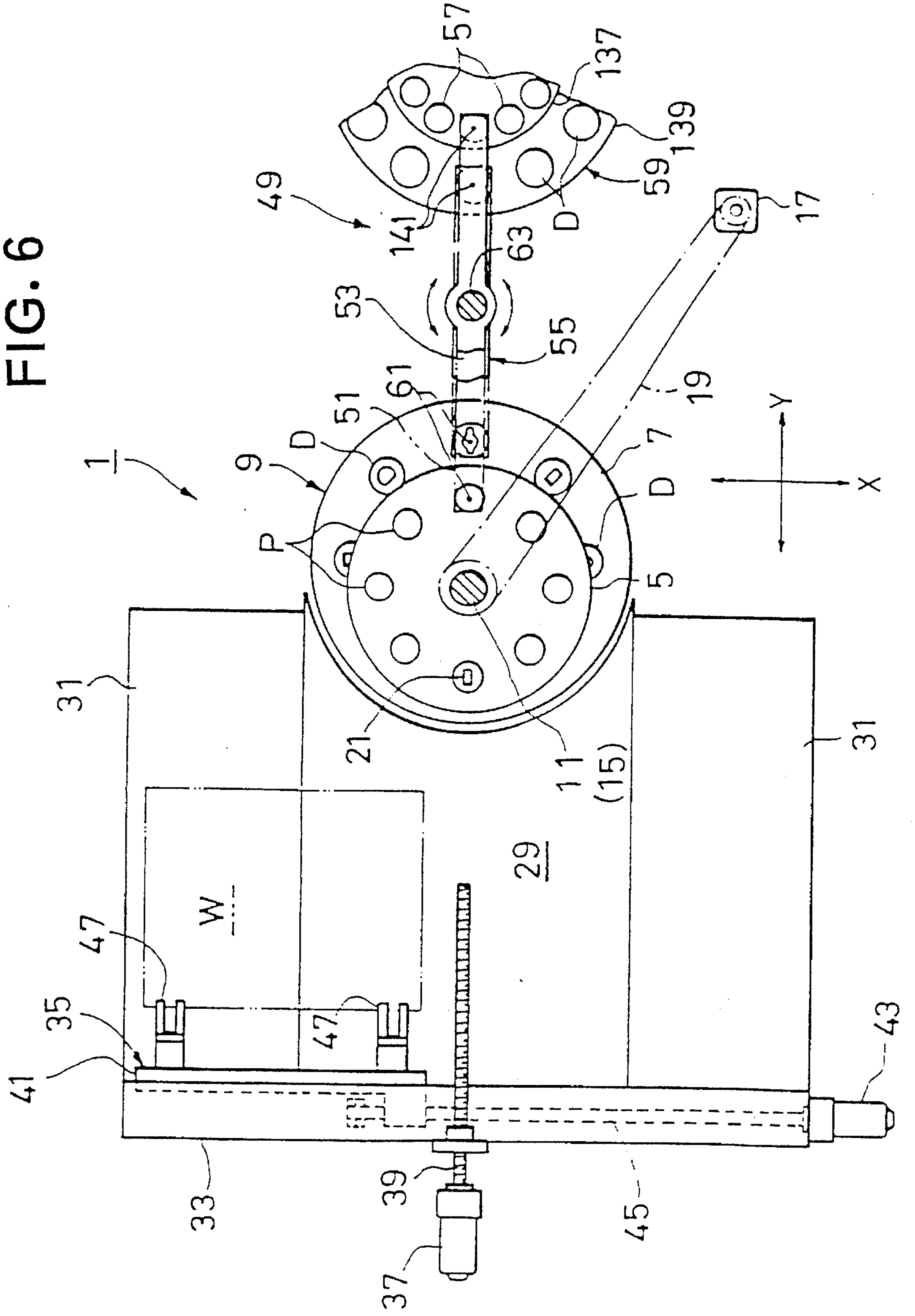
FIG. 6 is a cross-sectional view taken along the lines A—A shown in FIG. 5.

FIGS. 5 and 6 show a turret punch press provided with an automatic tool exchanging apparatus, to which embodiments of the mechanism for indexing a punch and a die according to the present invention can be applied. In FIGS. 5 and 6, the turret punch press 1 is provided with a portal frame 3. At roughly the middle portion within this portal frame 3, a turret 9 composed of a small-diameter upper turret 5 and a large-diameter lower turret 7 is rotatably supported by the portal frame 3.

In more detail, a plurality of punch die sets each composed of a punch P and a die D are arranged along the circumferences of the upper turret 5 and the lower turret 7, respectively. Further, both the upper and lower turrets 5 and 7 are rotatably supported by the portal frame 3 via rotary axles 11 and 13 (formed integral with the upper and lower turrets 5 and 7) and bearings 15, respectively. To rotate the upper turret 5 and the lower turret 7, a drive motor 17 as shown in FIG. 6 is driven. The rotative power of the motor 17 is transmitted to the rotary axle 11 or 13 via a rotation transmitting member 19 (e.g., a chain belt), also as shown in FIG. 6. The rotary axles 11 and 13 are both formed eccentrically, and the punching position and the punch and die indexing positions are located so as to be remotely opposed to each other on the turrets 5 and 7, on a line obtained by connecting both the centers of the rotary axles 11 and 13 when seen on a plane.

The punching position 21 is determined on the left side of the turret 9. Further, a connecting rod 25 and a striker 27 are driven when a crankshaft 23 is rotated by a drive motor (not shown) mounted on the upper frame of the portal frame 3. Therefore, work W located at the punching position 21 can be punched out at any desired processing position, under the conditions that the punch P and the die D arranged on the upper turret 5 and the lower turret 7 are both located at the punching position 21 and further the punch P is driven by the striker 27 in cooperation with the die D. Here, the striker 27 is driven via the connecting rod 25 when the crankshaft 23 is rotated by a drive motor (not shown) mounted on the upper frame of the portal frame 3. Further, the striker 27 can be also driven up and down by a hydraulic cylinder operated by a fluid.

Under the portal frame 3, a fixed center table 29 is disposed, and a movable table 31 is provided so as to extend along both the sides of the center table 29 and movable in the Y-axis direction (a horizontal direction in FIGS. 5 and 6). The movable table 31 can be moved smoothly in the Y-axis direction being guided by a plurality of guides (not shown) extending in the same Y-axis direction.

Over the left end of the movable table 31, a carriage base 33 is provided so as to extend in the X-axis direction (a direction perpendicular to paper in FIG. 5 or a vertical direction in FIG. 6). Further, a work locating device 35 is provided on the carriage base 33. Therefore, the carriage base 33 can be moved in the Y-axis direction by a servomotor 37, for instance via a screw rod (e.g., a ball screw) 39 and a nut member (not shown). Further, on the carriage base 33, a carriage 41 is mounted so as to be movable in the X-axis direction by a servomotor 43, for instance via a screw rod (e.g., a ball screw) 45 and a nut member (not shown). A plurality of clamps 47 for clamping the work W are arranged on and attached to the carriage 41.

Owing to the construction as described above, when the carriage base 33 is moved in the Y-axis direction and further the carriage 41 is moved in the X-axis direction, the work W clamped by the work clamps 47 can be moved in both the X- and Y-axis directions to any desired punching position 21 for punching processing of the work W.

A punch and die exchanging device 49 is provided near and on the right side of the upper and lower turrets 5 and 7 (see FIG. 6). The punch and die exchanging device 49 is composed of a tool changer 55 having a punch change arm 51 and a die change arm 53 and a tool magazine 59 for accommodating a plurality of punch sets 57 and dies D.

In more detail, there exists a difference in diameter between the upper and lower turrets 5 and 7, so that a difference in height can be obtained on the side remote from the punching position 21, as shown in FIGS. 5 and 6, respectively. This stepped (height difference) portion of both the turrets 5 and 7 serves as the punch and die exchange positions 61 in common with the punch and die indexing positions. In the vicinity of this exchange positions 61, the tool changer 55 is disposed.

Figure 7:
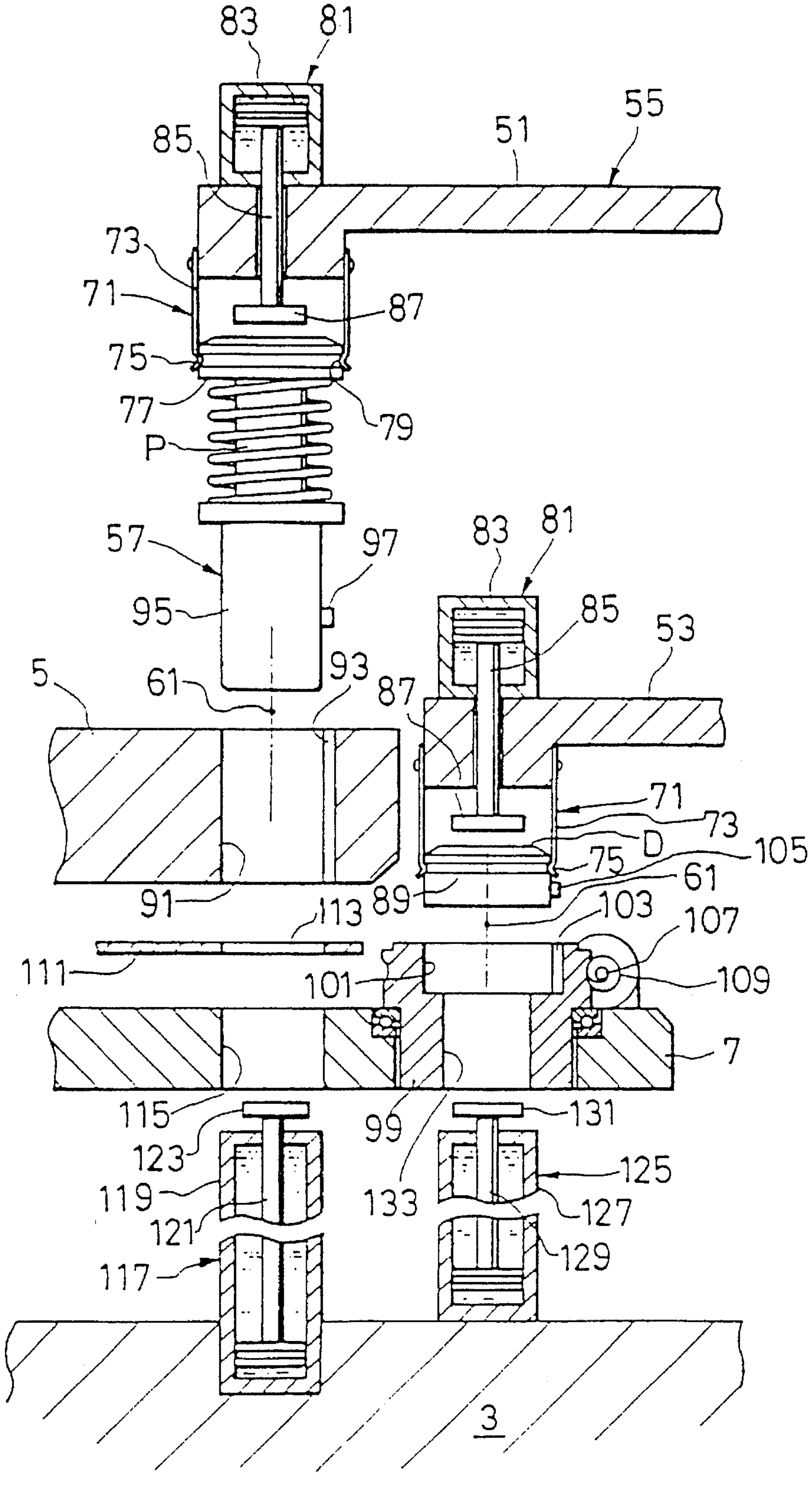
FIG. 7 is an enlarged side cross-sectional view of an tool exchanger shown in FIG. 5.

With reference to FIG. 7 additionally, the tool changer 55 is provided with a long punch change arm 51 and a short die change arm 53. Both the long and short change arms 51 and 53 are formed so as to project from a stay 63 (see FIGS. 5 and 6). Both ends of this stay 63 are rotatably supported by the portal frame 3 via two bearings 65, respectively, as shown in FIG. 5. The stay 63 can be rotated by a motor 67 via a rotation transmitting member 69 (e.g., gears).

At both the ends of the punch change arm 51, a gripping device 71 for gripping the punch die set 57 is provided so as to extend vertically from the punch change arm 51, respectively, as best shown in FIG. 7. The gripping device 71 is of a leaf spring gripper (73) type, for instance. The punch die set 57 can be gripped by the gripping device 71, when a catch portion 75 formed at an end of the leaf spring gripper 73 is engaged with an engage groove 79 formed along the outer circumference of a head portion 77 of the punch P assembled in the punch die set 57. Further, a cylinder 83 operated by fluid pressure, for instance is provided as a pushing member 81 on the punch change arm 51, and a disk 87 is attached to an end of a piston rod 85 associated with the cylinder 83.

The die change arm 53 is also provided with a gripping device 71 and a push member 81, in the same way as with the case of the punch change arm 51. Further, an engage portion 75 formed in a leaf spring gripper 73 of the gripping device 71 is also engaged with or disengaged from an engage groove 89 formed along the outer circumference of the die D.

Further, a hole 91 into which the punch die set 57 is inserted is formed in the upper die turret 5, and a key groove 93 is formed within this hole 91. Therefore, when a key 97 formed on the outer circumference of a punch guide 95 is engaged with this key groove 93, the punch die set 57 can be located in position. Further, a hole 101 into which the die D is inserted is formed in a worm wheel (also used as a rotary die holder in common) 99 mounted on the lower turret 7, and a key groove 103 is formed within this hole 101. Therefore, when a key 105 formed on the outer circumference of a die D is engaged with this key groove 103, the die D can be located in position.

The worm wheel 99 used in common as the rotary die holder is in mesh with a worm 109 formed on a die rotating transmission shaft 107 (only shown partially). Therefore, when the worm wheel or the rotary die holder 99 is rotated by a drive motor (not shown), the die D engaged with the rotary die holder 99 can be located in position. Further, a turret table 111 (see FIG. 7) for supporting the work W is formed with a hole 113 just under the hole 91 formed in the upper turret 5. Further, the lower turret 7 is also formed with a similar hole 115 (the same in diameter as the hole 91) just under the hole 113. A punch push-up member 117 is provided just under this hole 115. This punch push-up member 117 is a cylinder 119 operated by a fluid, for instance. Further, a push-up plate 123 which can pass through the hole 115 is attached to an end of a piston rod 121 associated with this cylinder 119. Further, a die push-up member 125 similar to the punch push-up member 117 is provided just under a hole 133. This hole 133 is formed in the worm wheel or the rotary die holder 99 rotatably fitted to the lower turret 7. This die push-up member 125 is also a cylinder 127 operated by a fluid, for instance. Further, a push-up plate 131 which can pass through the hole 133 is attached to an end of a piston rod 129 associated with this cylinder 127.

Owing to the construction as described above, when a pair of used punch P and die D attached to the upper and lower turrets 5 and 7, respectively are required to be removed, the punch change arm 51 and the die change arm 53 are both located at two exchange positions 61 (see FIG. 5) at which both the punch P and the die D can be exchanged. Further, the cylinders 119 and 127 for the punch push-up member 117 and the die push-up member 125 are both operated to project both the piston rods 121 and 129 upward, so that the push-up plates 123 and 131 both formed integral with the piston rods 121 and 129, respectively are both moved upward to push the punch P and die D in the upward direction.

The punch die set 57 and the die D both pushed up are gripped by the leaf spring grippers 73 of the gripping devices 71 provided for the punch change arm 51 and the die change arm 53, respectively. After the punch die set 57 and the die D have been gripped, the piston rods 121 and 129 of the punch push-up member 117 and the die push-up member 125 are both lowered. Under these conditions, the stay 63 formed integral with the respective change arms 51 and 53 is rotated by 180 degrees, to locate the punch P and the die D at the accommodation positions 141 of the tool magazine 59 (described later in detail) for accommodation of the used punch P and the die D on the tool magazine 59.

Further, in order to set the required punch P and the die D, the required punch P and the die D are first taken out of the tool magazine 59, and then the punch change arm 51 and the die change arm 53 are located at the change positions 61, respectively. Further, the cylinders 83 of the push members 81 are operated to project the piston rods 85, respectively. Therefore, since the disks 87 attached to the ends of the piston rods 85 push the punch P and the die D respectively, the engage groove 79 formed at the head portion 77 of the punch P and the engage groove 89 formed in the die D are both disengaged from the engage portions 75 of the leaf spring grippers 73, respectively. Consequently, the punch die set 57 is inserted into the hole 91 formed in the upper turret 5 and the die D is inserted into hole 101 formed in the worm wheel or the rotary die holder 99, with the result that the tool setting work ends.

With reference to FIGS. 5 and 6, the tool magazine 59 will be described. The tool magazine 59 is composed of a stay 135, a small-diameter punch disk 137 attached to the upper portion of the stay 134, and a large-diameter die disk 139 attached to the lower portion of the stay 134. The punch die set 57 accommodated on the punch disk 137 and the die D accommodated on the die disk 139 are both set at such exchange positions 141 as to correspond to the exchange positions 61 of the upper and lower turrets 5 and 7 (in symmetrical positional relationship with respect to the stay 63).

Further, the stay 135 is rotatably supported by the portal frame 3 via two bearings 143, and rotated by a motor 145 via a rotation transmitting member 147 (e.g., gears). Further, the rotations (angular positions) of the motor 145 for the tool magazine 59 and the motor 67 for the tool exchanger 55 are so controlled that the punch change arm 51 and the die change arm 53 and the punch disk 137 and the die disk 139 are all rotated to and stopped at the exchange positions 61 and 141, respectively.

Just under the exchange positions 141 of the punch disk 137 and the die disk 139, there are provided two cylinders 119 and 127 quite the same as those of the punch push-up member 117 and the die push-up member 125 both provided just under the exchange positions 61 of the upper and lower turrets 5 and 7, respectively. Further, the punch disk 137 is formed with a plurality of holes 149 into which the punch die sets 57 each having a punch P can be inserted. Further, the die disk 139 is formed with a plurality of holes 151 into which the dies D are inserted and a plurality of holes 153 through which a push-up plate 131 attached to the piston rod 129 of the cylinder 127 for the die push-up member 125, respectively. In addition, the die disk 139 is formed with a hole 155 through which the push-up plate 123 attached to the piston rod 121 of the cylinder 119 for the punch push-up member 117 at a position just under the hole 149 into which the punch die set 57 is inserted.

Owing to the construction as described above, when the punch disk 137 and the die disk 139 attached to the stay 135 are rotated by the motor 145 via the rotation transmitting member 147, it is possible to locate any desired punch P and die D at the exchange positions 141, respectively. Further, the cylinder 119 for the punch push-up member 117 and the cylinder 127 for the die push-up member 125 are operated to project the piston rods 129 and 121, respectively so that the punch die set 57 and the die D can be pushed upward by the push-up plates 131 and 123, respectively. Therefore, the punch die set 57 and the die D can be both gripped by the leaf spring grippers 73 of the gripping devices 71 provided on the punch change arm 51 and the die change arm 53, respectively for tool exchange. Further, the punch die set 57 and the die D can be accommodated on the punch disk 137 and the die disk 139, in accordance with quite the same way as with the case of the tool exchanger 55, so that any detailed description thereof is omitted herein.

The operation of the punch and die exchange device 49 as constructed above will be described hereinbelow. First, the upper and lower turrets 5 and 7 are rotated to locate the usedpunch P and die D at the exchange positions 61, respectively. On the other hand, any punch P and die D required to be exchanged which are accommodated on the punch disk 137 and the die disk 139 of the tool magazine 59 are located at the exchange positions 141, respectively. Further, the punch change arm 51 and the die change arm 53 of the tool changer 55 are both located to the exchange positions 61 and 141, respectively.

Under these conditions, the tool exchange work starts. That is, on the side of the upper and lower turret 5 and 7, the cylinder 119 for the punch push-up member 117 and the cylinder 127 for the die push-up member 125 are both operated. Therefore, the punch P and the die D are both pushed upward and then gripped by the leaf spring grippers 73 of the gripping devices 71. After the punch P and the die D have been both gripped, the punch and die push-up members 117 and 125 are both contracted and restored to the original positions, respectively.

On the other hand, on the side of the tool magazine 59, since the punch P and the die D required to be exchanged have been already located at the exchange positions 141, the cylinders 127 and 119 for the punch and die push-up members 125 and 117 are operated. Therefore, the punch P and the die D to be exchanged are pushed upward and further gripped by the leaf spring grippers 73 of the gripping devices 71 provided on the punch and die change arms 51 and 53, respectively. After the punch P and the die D have been both gripped, the punch and die push-up members 125 and 117 are both contracted and restored to the original positions, respectively.

Thereafter, the punch and die change arms 51 and 53 are rotated by 180 degrees to locate the new punch P and die D required for the succeeding process at the exchange positions 61 of the upper and lower turrets 5 and 7 and further to locate the used punch P and die D at the exchange positions 141 at which the punch P and die D are accommodated to vacant positions of the tool magazine 59.

Under these conditions, on the side of the upper and lower turret 5 and 7, the cylinders 83 for the push members 81 provided on the punch and die change arms 51 and 53 are operated to push the head portion 77 of the punch P and the upper surfaces of the die D by the disks 87 attached to the ends of the piston rods 85, respectively. Therefore, the punch die set 57 is released from the engagement by the leaf spring gripper 73 of the gripping device 71 and then inserted into the hole 91 formed in the upper turret 5. In the same way, the die D is released from the engagement by the leaf spring gripper 73 of the gripping device 71 and then inserted into the hole 101 formed in the worm wheel or the rotary die holder 99, to complete the setting work of the punch die set 57 and the die D.

On the other hand, on the side of the tool magazine 59, by performing the same operation as described above, the used punch die set 57 can be inserted into the hole 149 formed in the die disk 137 and the used die D can be inserted into the hole 151 formed in the die disk 139, respectively to complete the accommodating work of the punch die set 57 and the die D to the tool magazine 59, respectively.

In the tool exchange apparatus as described above, the die D can be exchanged from above, so that the exchange work can be facilitated. Further, since the spacial restriction can be eliminated in designing the die D, it is possible to design more effective dies. In particular, it is possible to increase the parts accommodating space for a molding die. In addition, it is possible to realize an automatic tool exchange operation for the dies arranged on an automatic indexing station (which has been so far considered to be very difficult from the spacial problem). Accordingly, the structure of the automatic tool exchange apparatus which can include the automatic indexing function can be simplified. Further, in this case, it is preferable to use a non-contact type IC chip used for data communications, for instance in order to identify the dies D.

The embodiments which can index the angular positions of the punch P and the die D with the use of the punch and die exchange apparatus 49 as described above will be explained hereinbelow with reference to FIG. 1.

Figure 1A:
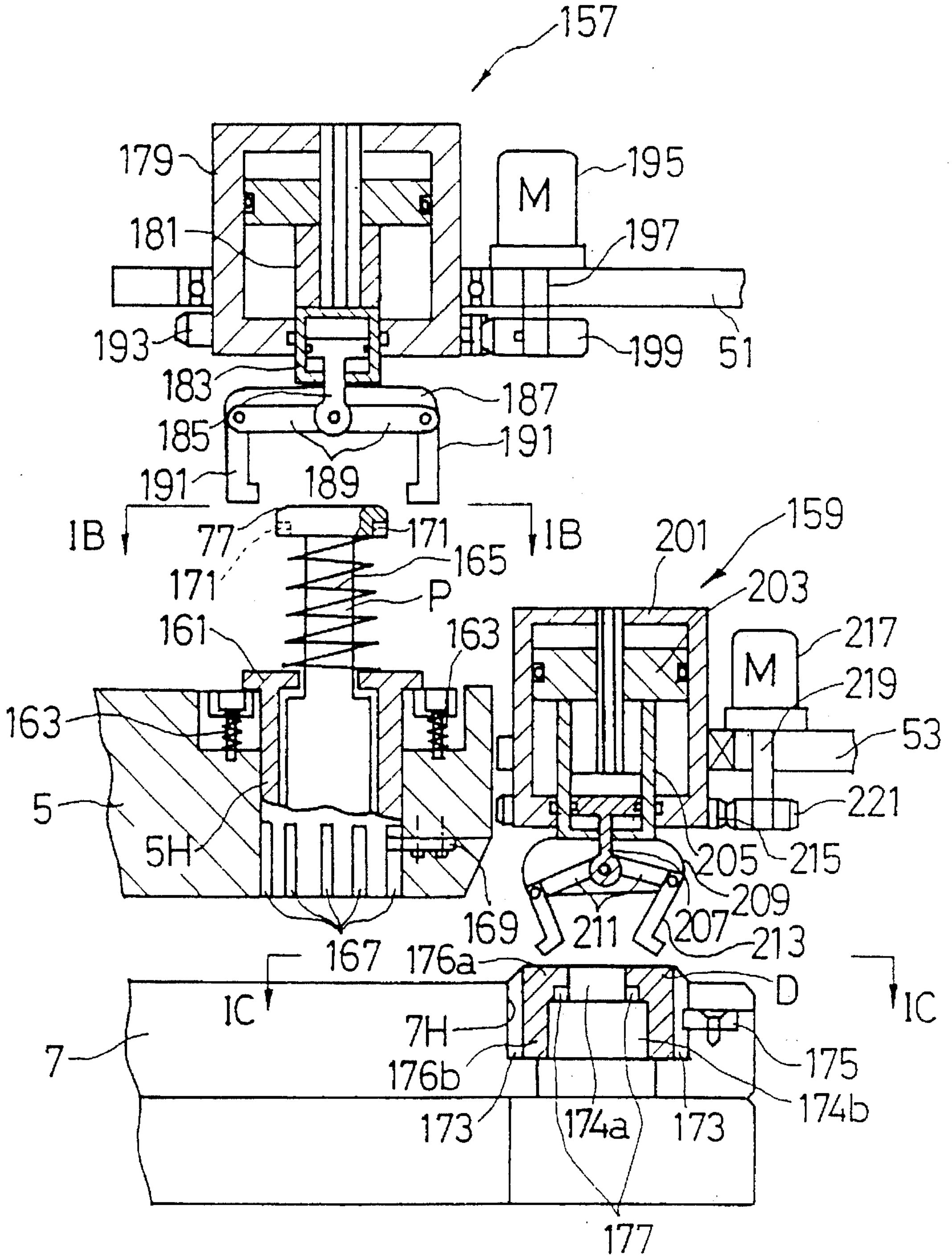
FIG. 1A is an enlarged cross-sectional view showing an embodiment of the punch and die indexing mechanism according to the present invention.
Figure 1B:
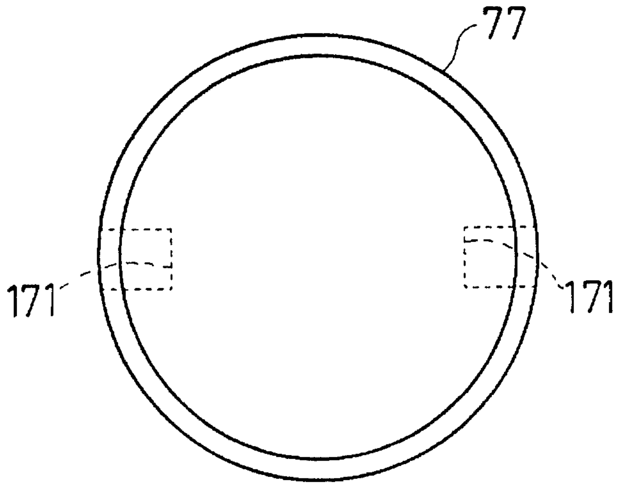
FIG. 1B is an enlarged cross-sectional view taken along the lines IB—IB shown in FIG. 1A.
Figure 1C:
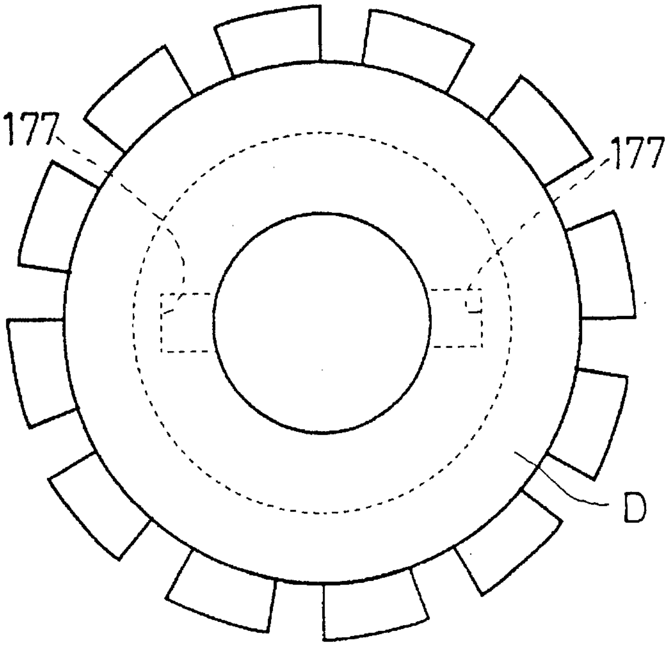
FIG. 1C is an enlarged cross-sectional view taken along the lines IC—IC shown in FIG. 1A.

In FIG. 1, punch and die support devices 157 and 159 are provided for the punch change arm 51 and the die change arm 53, respectively of the punch and die exchange apparatus 49 shown in FIG. 5. Therefore, the same reference numerals have been retained for the similar parts or elements which have the same functions as with the case of the automatic punch and die exchange apparatus 49 as already explained, without repeating the same description thereof.

In FIG. 1, a punch guide 161 is fitted to a set hole 5H formed in the upper turret 5 so as to be movable up and down against an upward urging force of a lifter spring 163. A plurality of key grooves 167 are formed on the outer circumference of the punch guide 161 at regular angular intervals. A key 169 engageable with one of the key grooves 167 is disposed at a part of the set hole 5H of the upper turret 5. Further, an pair of punch grooves 171 are formed in the outer circumference of the head 77 of the punch P. The punch grooves 171 are located at opposite sides of the head 77. The punch grooves 171 open at the circumferencial surface and the bottom surface of the head 77. A spring 165 is mounted between the head 77 and the punch guide 161.

On the other hand, a die D is fitted to a set hole 7H formed in the lower turret 7. A plurality of key grooves 173 are formed on the outer circumference of the die D at regular angular intervals. Further, a key 175 engageable with one of the key grooves 173 is disposed at a part of the set 7H of the lower turret 5. A die hole **174*a* is formed in the upper portion 176*a* of the die D, and a lower hole 174*b* is formed in the lower portion 176*b* of the die D. Further, an die groove 177 is formed in the inner circumference of the upper portion 176*a* of the die D. The grooves 177 are located at opposite sides of the inside circumference of the upper potion 176*a* of the die D. The grooves 177 open at the inner circumferencial surface and the bottom surface of the upper portion 176*a*** of the die D.

A punch support device 157 comprises a vertical motion cylinder 179 rotatably supported on the punch change arm 51. A gripper open-close cylinder 183 is provided on an end portion of a piston rod 181 associated with the vertical motion cylinder 179.

On the end of the piston rod 185 associated with the gripper open-close cylinder 183, a plurality of gripper claws 191 are provided on the gripper 187 via a plurality of links 189. A gear 193 is fitted to the lower outer circumference of the vertical motion cylinder 179, and a motor 195 is mounted on the upper portion of a part of the punch change arm 51. A gear 199 is fitted to an output shaft 197 of this motor 195. This gear 199 is in mesh with the gear 193.

A die support device 159 comprises a vertical motion cylinder 201 rotatably supported on the die change arm 53. A gripper open-close cylinder 205 is provided on an end portion of a piston 203 associated with the vertical motion cylinder 201.

On the end of the piston rod 207 associated with the gripper open-close cylinder 205, a plurality of gripper claws 213 are provided on the gripper 209 via a plurality of links 211. A gear 215 is fitted to the lower outer circumference of the vertical motion cylinder 201, and a motor 217 is mounted on the upper portion of a part of the die change arm 53. A gear 221 is fitted to an output shaft 219 of this motor 217. This gear 221 is in mesh with the gear 215.

In the above mentioned construction, in FIG. 1, when the punch P and the die D fitted to the set holes 5H and 7H formed in the upper and lower turrets 5 and 7, respectively are indexed; that is, the angular position of the punch P and the die D are indexed, respectively. The vertical motion cylinders 179 and 201 are operated to lower both the piston rods 181 and 203, respectively. Further, the gripper claws 191 are located at the outer position of the head 77 of the punch P, and the gripper claws 213 are inserted into the die D.

Successively, the gripper open-close cylinders 183 and 205 are both operated to engage the distal ends of gripper claws 191 and 213 with the punch grooves 171 and the die grooves 177, respectively. So that the punch P can be gripped, and are restricted the angle between the gripper 187 and the punch P; and the die D can be gripped, and are restricted the angle between the gripper 209 and the die D.

Under these conditions, the gripper claws 191 and 213 are raised to disengage the key grooves 167 and 173 formed in the punch guide 161 and the die D from the keys 169 and 175, respectively. Thereafter, the gripper claws 191 and 213 are both stopped. Under these conditions that the keys 169 and 175 are both removed from the key grooves 167 and 173, respectively, the motors 195 and 217 are both driven to rotate the vertical motion cylinders 179 and 201 via the output shafts 197 and 219 and the gears 199 and 221 and the gears 193 and 215, respectively. Therefore, the punch P and the die D gripped by the gripper claws 191 and 213 are rotated by a desired angle, and then stopped. Thereafter, the gripper claws 191 and 213 are lowered to engage the keys 169 and 175 with a determined key grooves 167 and 173, respectively. Consequently, it is possible to index the angular positions of the punch P and the die D easily. Further, the gripper claws 191 and 213 are both returned to the original positions. Further, it is sufficient to raise the key grooves 167 and 173 to such positions as to be removed from the keys 169 and 175, respectively.

In the above-mentioned embodiment, although the key grooves 167 and 173 are formed in the punch guide 161 and the die D, and the keys 169 and 175 are disposed at part of the set holes 5H and 7H of the upper and lower turrets 5 and 7, respectively. However, it is also possible to obtain the same functions, even if the keys 169 and 175 are disposed for the punch guide 161 and the die D, and the key grooves 167 and 173 are formed in the set holes 5H and 7H of the upper and lower turrets 5 and 7, respectively.

Figure 2:
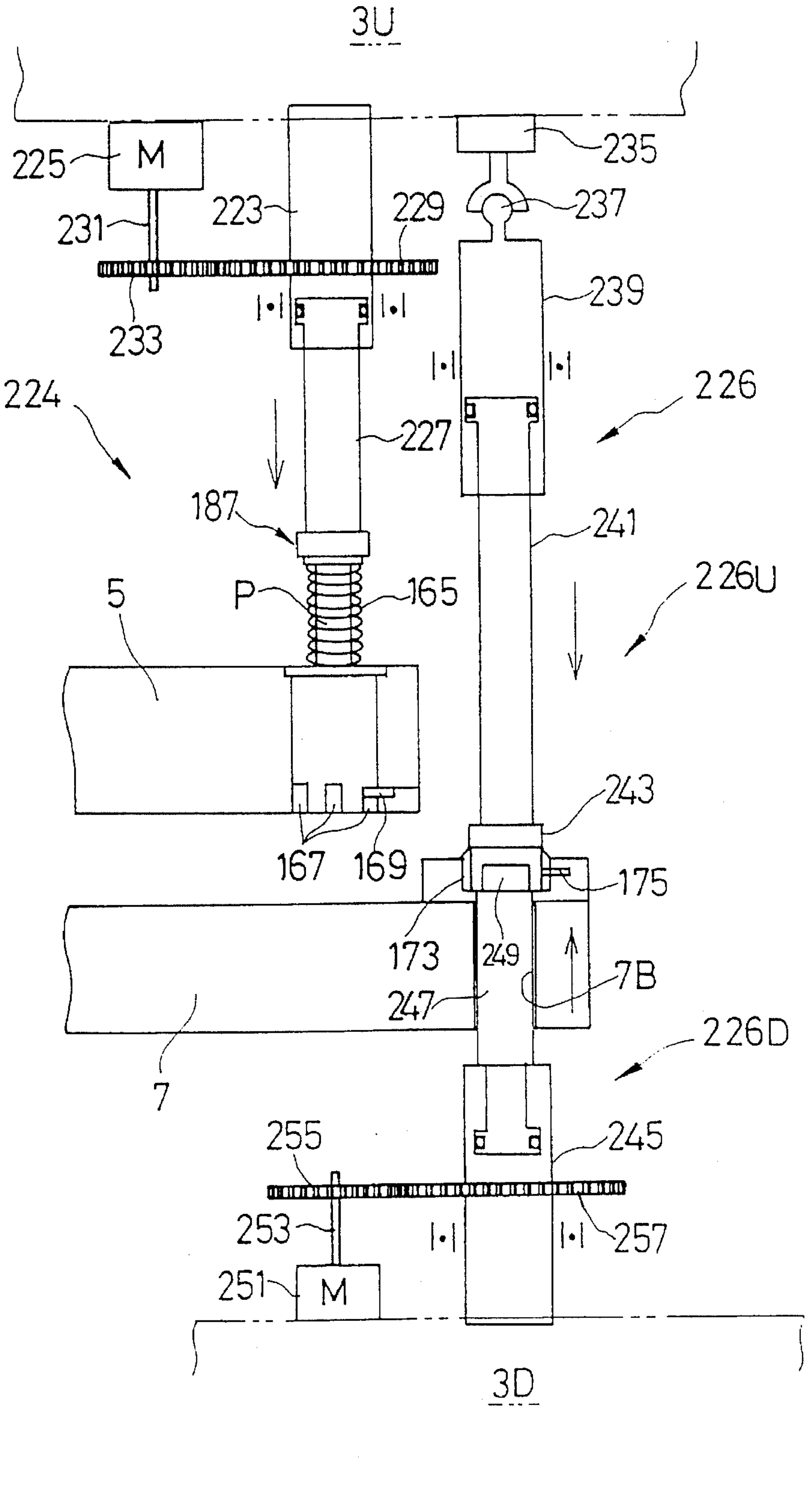
FIG. 2 is an enlarged cross-sectional view showing another embodiment of the punch and die indexing mechanism according to the present invention.

FIG. 2 shows another embodiment of the punch and die supporting devices 224 and 226 both different from those shown in FIG. 1. In FIG. 2, the same reference numerals have been retained for the similar parts or elements which have the same functions as with the case of the embodiment shown in FIG. 1, without repeating the any detailed description thereof. In FIG. 2, on the lower portion of the upper frame 3U of the portal frame 3, a vertical motion cylinder 223 and a motor 225 for constituting a part of the punch support device 157 are attached. On an end of a piston rod 227 associated with the vertical motion cylinder 223, an open-close gripper 187 as shown in FIG. 1 is provided as a hook. The construction of this gripper 187 has been already explained, so that the any detailed description thereof is omitted herein.

A gear 229 is fitted to the vertical motion cylinder 223. On the other hand, another gear 233 is fitted to an output shaft 231 of the motor 225. The gear 233 is in mesh with the gear 229.

Owing to the construction as described above, when the vertical motion cylinder 223 is operated, the gripper 187 is moved up and down via the piston rod 227. Further, when the motor 225 is driven, the gripper 187 can be rotated via the output shaft 231, the gears 233 and 229, the vertical motion cylinder 223 and the piston rod 227.

The die support device 226 is provided with upper and lower die support devices 226U and 226D. The upper die support device 226U is provided with a bracket 235 attached to the lower portion of the upper frame 3U of the portal frame 3. A push cylinder 239 is rotatably supported by the bracket 235 via a joint 237. A push plate 243 is formed integral with an end of a piston rod 241 associated with the push cylinder 239.

The lower die support device 226D is provided with a rotary vertical motion cylinder 245 supported on the upper portion of the lower frame 3D of the portal fame 3. A piston rod 247 associated with the vertical motion cylinder 245 is fitted into a fitting hole 7B formed in the lower turret 7. A plate 249 fitted into a hole of the die D is formed integral with the piston rod 247 at an end thereof.

A motor 251 is mounted on the upper portion of the lower frame 3D of the portal frame 3. A gear 255 is fitted to an output shaft 253 of the drive motor 251. This gear 255 is in mesh with a gear 257 fitted to the vertical motion cylinder 245.

Owing to the construction as described above, when the vertical cylinder 245 is operated, the plate 249 is moved up and down via the piston rod 247. Further, when the drive motor 251 is driven, the plate 249 is also rotated via the output shaft 253, the gears 255 and 257, the vertical motion cylinder 245 and the piston rod 247.

Accordingly, in FIG. 2, when the punch P and the die D attached to the upper and lower turrets 5 and 7 are required to be indexed, the vertical motion cylinders 223 and 239 are both operated to lower the piston rods 227 and 241. Then, the lowered piston rod 227 grips the punch P attached on the upper turret 5, and the lowered piston rod 241 pushes the upper surface of the die D by the push plate 243. Further, the vertical motion cylinder 245 is operated to raise the piston rod 247 upward so that the plate 249 can be fitted to the die D.

Figure 3:
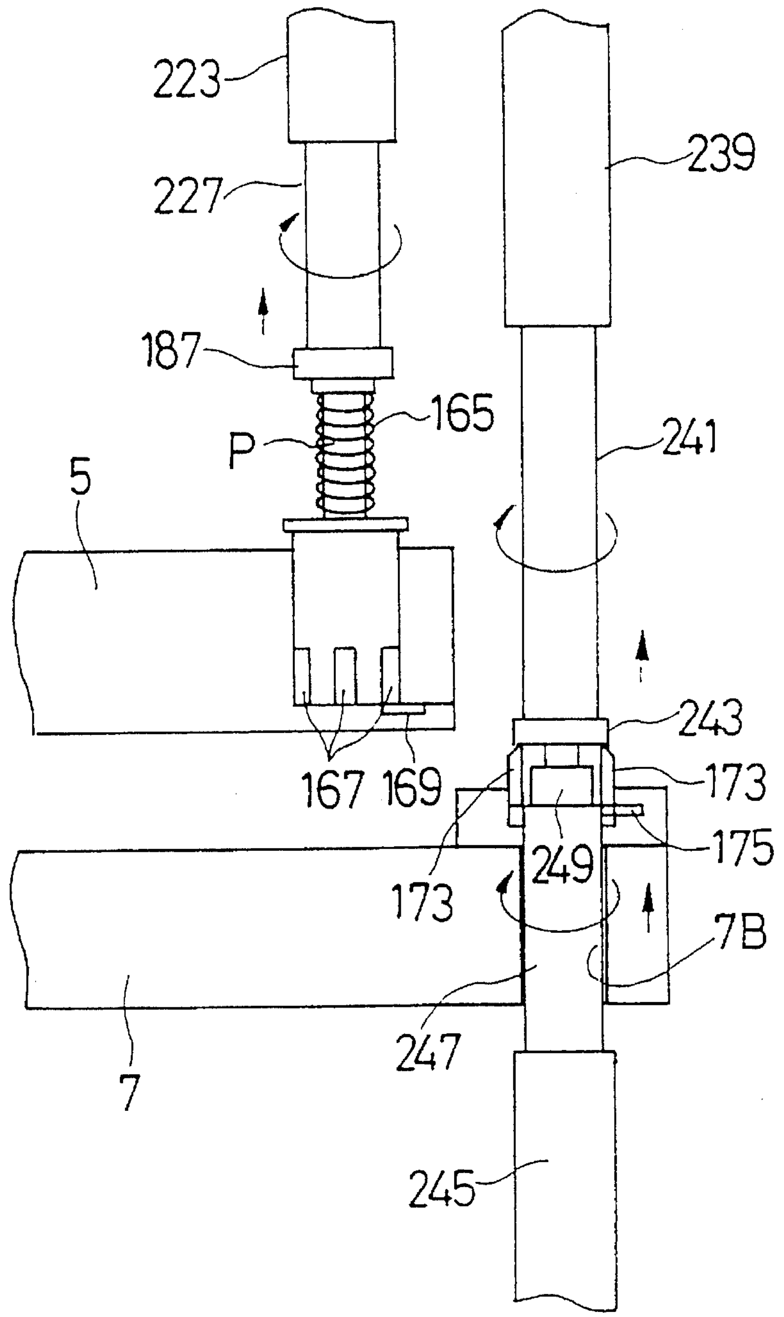
FIG. 3 is an illustration for assistance in explaining the operation of the punch and die indexing mechanism shown in FIG. 2.

Thereafter, under the condition that the punch P is kept gripped by the gripper 187, the piston rod 227 is raised to remove the key groove 167 formed in the punch P from the key 169, as shown in FIG. 3. Successively, the drive motor 225 is driven to rotate the punch P through any desired angle.

Further, the piston rod 247 is raised and simultaneously the piston rod 241 is also raised, so that the die D can be raised being sandwiched between the push plate 243 and plate 249, to remove the key groove 173 formed in the die D from the key 175 as shown in FIG. 3. Successively, the drive motor 251 is driven to rotate the die D through any desired angle.

Thereafter, the piston rod 227 is lowered to engage any desired key groove 167 with the key 169, so that the punch P can be indexed at any desired angular position. Further, the piston rod 241 and the piston rod 247 are both lowered, simultaneously to engage the any desired key groove 173 with the key 175, so that the die D can be indexed at any desired angular position.

Figure 4:
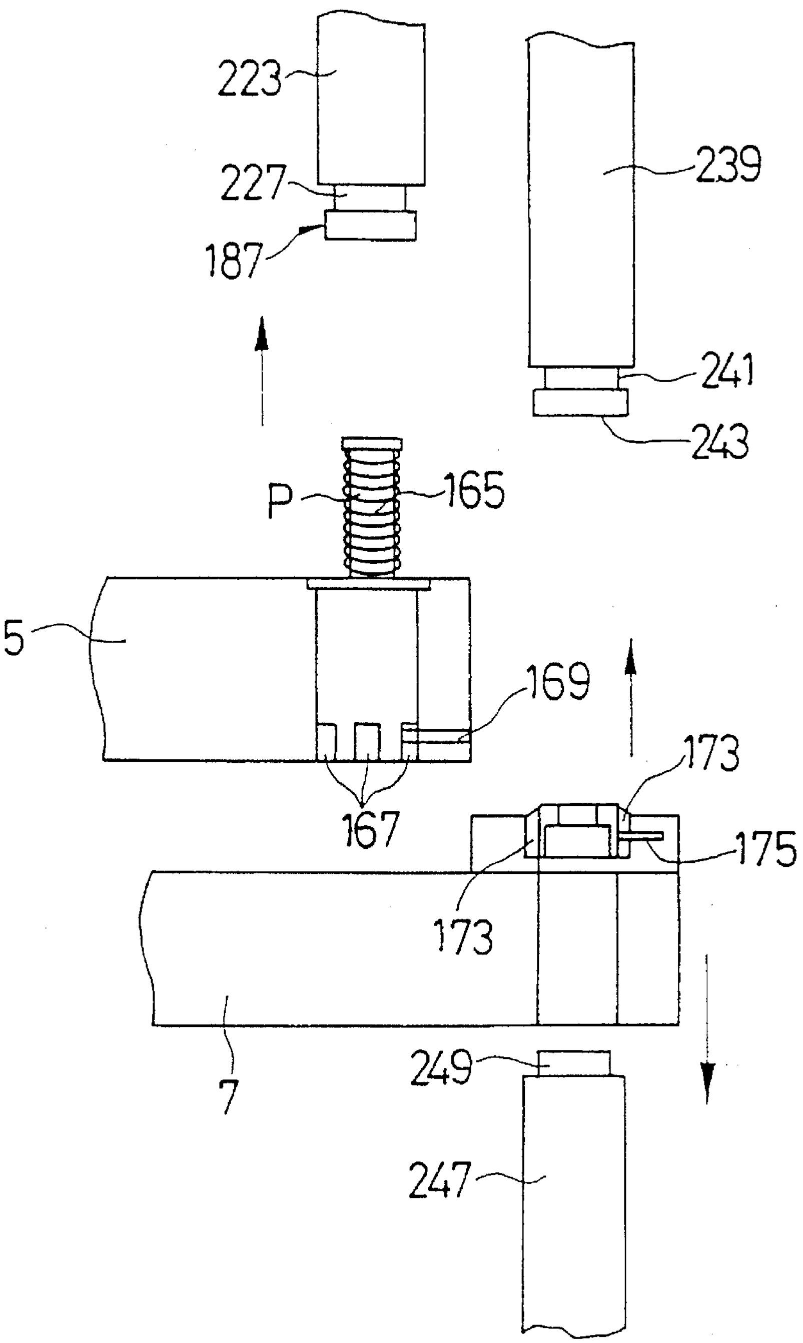
FIG. 4 is an illustration for assistance in explaining the operation of the same punch and die indexing mechanism shown in FIG. 2.

After the punch P and the die D have been both indexed at any desired angular position, the gripper 187 is removed from the punch P and the piston rod 227 is raised. Further, the piston rod 241 is raised but the piston rod 247 is lowered, so as to be returned to the original position as shown in FIG. 4.

In the above-mentioned embodiment, it is possible to obtain the same functions when the keys 169 and 175 are formed on the outer circumferences of the punch P and the die D, and a plurality of key grooves 167 and 173 are formed on the inner circumferences of the set holes 5H and 7H of the upper and lower turrets 5 and 7, respectively.

In the above-mentioned embodiment, it is also possible replace the lower die support device 226D and the push plate 243 attached to an end of the piston rod 241, with the gripper 209 as shown in FIG. 1. Further, it is also possible to replace the upper die support device 226D and the plate 249 provided on the piston rod 247, with the gripper 209 (as shown in FIG. 1) attached so as to be directed upward. Further, it is also possible to sandwich the punch P vertically between upper and lower punch support devices, by forming a through hole in the lower turret 7 and by providing the lower punch support device 226D on the lower frame 3D at the punch P position, in the same way as with the case of the die D sandwiched by the upper and lower die support devices 226U and 226D as shown in FIG. 1.

As described above, in the present invention, since the punch and die support devices 224 and 226 are provided, it is possible to easily index the angular positions of the punch P and the die D attached to the upper and lower turrets 5 and 7, respectively, with the result that the indexing operation of the punch P and the die D can be easily automatized.

Further, the present invention ls not limited to only the above-mentioned embodiments, and various changes and modifications may be made. For instance, in the present embodiments, the case where the angular positions of the punch P and the die D attached to the upper and lower turrets 5 and 7 can be indexed automatically has been explained by way of example. However, in the present invention, since the rotative centers of the upper and lower turrets 5 and 7 are determined to be eccentric from each other and the a position at which the upper and lower turrets are overlapped upon each other is determined to be a punching position and positions remotely opposite to the punching position are determined to be indexing positions, even in the case of the manual indexing operation, it is possible to index the angular positions of the punch P and the die D more easily, as compared with the conventional construction.

As described above, in the turret punch press according to the present invention, the rotation of the upper and lower turrets can be indexed more easily as occasion demands, and further can be automatized easily.

What is claimed is:

1. A turret punch press comprising:

an upper rotatable turret having a plurality of punch set holes and a punch received in a punch set hole;

a lower rotatable turret having a plurality of die set holes and a die received in a die set hole, wherein a diameter of the lower turret is larger than that of the upper turret, rotational centers of the upper and lower turrets are eccentric from each other so that one of the punch set holes is overlapped over one of the die set holes, a position where one of the punch set holes is overlapped over one of the die set holes is a punching position where a work piece is punched, and a position which is opposite to the punching position and at which one of the punch set holes is not overlapped with any of the die set holes is an indexing position where the punch and die are indexed;

upper support devices for a punch provided over the indexing position, for gripping the punch in the punch set hole, extracting the gripped punch from the punch set hole vertically, rotating the extracted punch through a predetermined angle about an axis of the punch in order to index the punch, inserting the rotated punch into the punch set hole vertically, and releasing the inserted punch; and lower support devices for a die provided at a location selected from the group of locations consisting of a location over the indexing position and a location under the indexing position, for gripping the die in the die set hole, extracting the gripped die from the die set hole vertically, rotating the extracted die through a predetermined angle about an axis of the die in order to index the die, inserting the rotated die into the die set hole vertically, and releasing the inserted die.

2. The turret punch press of claim 1, further comprising a plurality of key grooves which are formed on an outer circumference of the punch at regular angular intervals, and a key engageable with one of the key grooves of the punch said key projectingly disposed on an inner circumference of the punch set hole; and a plurality of key grooves Which are formed on an outer circumference of the die at regular angular intervals, and a key engageable with one of the key grooves of the die said key projectingly disposed on an inner circumference of the die set hole.

3. The turret punch press of claim 1, further comprising a key which is projectingly disposed on an outer circumference of the punch, and a plurality of key grooves engageable with the key of the punch, said key grooves formed on an inner circumference of a punch set hole at regular angular intervals; and a key which is projectingly disposed on an outer circumference of the die, and a plurality of key grooves engageable with the key of the die, said key grooves formed on an inner circumference of a die set hole at regular angular intervals.

* * * * *